US008691427B2

(12) United States Patent
Chao

(10) Patent No.: US 8,691,427 B2
(45) Date of Patent: Apr. 8, 2014

(54) METHOD FOR MANUFACTURING A BATTERY SHELL APPLICABLE TO AN ELECTRONIC DEVICE

(71) Applicant: Getac Technology Corporation, Hsinchu (TW)

(72) Inventor: Po-Tsun Chao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 13/681,344

(22) Filed: Nov. 19, 2012

(65) Prior Publication Data

US 2013/0171509 A1 Jul. 4, 2013

Related U.S. Application Data

(60) Provisional application No. 61/581,531, filed on Dec. 29, 2011.

(30) Foreign Application Priority Data

Apr. 25, 2012 (CN) .......................... 2012 1 0123147

(51) Int. Cl.
*H01M 2/04* (2006.01)
*H01M 2/02* (2006.01)
*B29C 45/00* (2006.01)

(52) U.S. Cl.
CPC .......... *H01M 2/0287* (2013.01); *H01M 2/0277* (2013.01); *H01M 2/02* (2013.01); *H01M 2/0292* (2013.01); *H01M 2/0417* (2013.01); *Y02E 60/12* (2013.01); *B29C 45/00* (2013.01)
USPC ........... 429/176; 429/121; 429/122; 429/143; 429/163; 429/170

(58) Field of Classification Search
CPC ...... Y02E 60/12; H01M 2/02; H01M 2/0237; H01M 2/0202; H01M 2/0277; H01M 2/0417; H01M 2/0292; H01M 2/0287; B29C 45/00
USPC ......... 429/121, 122, 143, 147, 161, 163, 170, 429/176, 178, 179, 181
See application file for complete search history.

(56) References Cited

U.S. PATENT DOCUMENTS

2011/0003197 A1* 1/2011 Kritzer et al. ................. 429/185

* cited by examiner

*Primary Examiner* — Patrick Ryan
*Assistant Examiner* — Ben Lewis

(57) ABSTRACT

The disclosure discloses a method for manufacturing a battery shell applicable to an electronic device. The method includes providing a metal substrate, a metal implanting component including a connecting part disposed thereon; bonding the metal implanting component to the metal substrate; and forming a plastic component on the metal substrate by an insert molding process. The plastic component covers the metal implanting component. By bonding the plastic component to the bonding part of the metal implanting component, the bonding strength is enforced.

10 Claims, 3 Drawing Sheets

METHOD FOR MANUFACTURING A BATTERY SHELL APPLICABLE TO AN ELECTRONIC DEVICE

BACKGROUND

1. Technical Field

The disclosure relates to a method for manufacturing a battery shell applicable to an electronic device, and in particular, to a method for bonding a plastic component to a metal component by an insert molding process.

2. Related Art

The traditional insert molding process is to form a plastic component on a metal substrate by injection molding. However, the material of the metal substrate and that of the plastic component are different, so the bonding effect is poor. In order to solve the above-mentioned problem, a rough structure (i.e. a convex portion or a groove) is formed on the surface where the metal substrate is bonded to the plastic component to increase the bonding strength between the metal substrate and the plastic component.

The above-mentioned method may increase the bonding effect between the metal substrate and the plastic component. However, when the bonding area between the metal substrate and the plastic component is too small, the above-mentioned method may not provide a good bonding effect. Therefore, how to increase the bonding strength between the metal substrate and the plastic component after the insert molding process becomes the main subject which people in the art do study.

SUMMARY

An embodiment discloses a method for manufacturing a battery shell applicable to an electronic device. The method includes providing a metal substrate and a metal implanting component including a bonding part disposed thereon; bonding the metal implanting component to the metal substrate; and forming a plastic component on the metal substrate by an insert molding process. The plastic component covers the metal implanting component. By bonding the plastic component to the bonding part of the metal implanting component, the bonding strength is enforced.

BRIEF DESCRIPTION OF THE DRAWINGS

The present disclosure will become more fully understood from the detailed description given herein below for illustration only, thus, are not limitative of the disclosure, and wherein.

DETAILED DESCRIPTION

The detailed features and advantages of the disclosure are described below in great detail through the following embodiments, the content of the detailed description is sufficient for those skilled in the art to understand the technical content of the disclosure and to implement the disclosure accordingly. Based upon the content of the specification, the claims, and the drawings, those skilled in the art can easily understand the relevant objectives and advantages of the disclosure.

Figure 1:
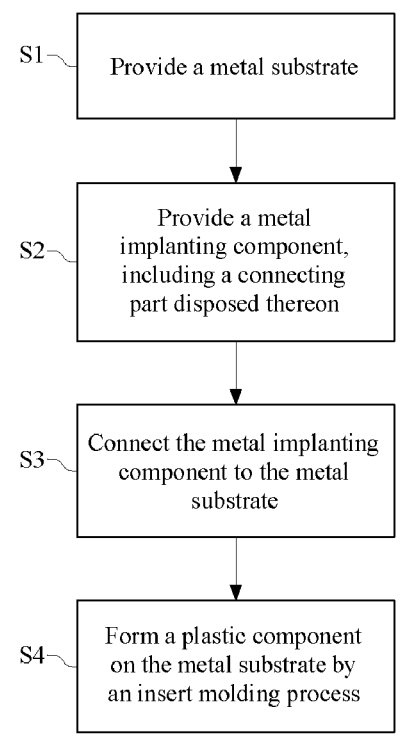
FIG. 1 is a flow chart of manufacturing a battery shell of an electronic device according to an embodiment.
Figure 2:
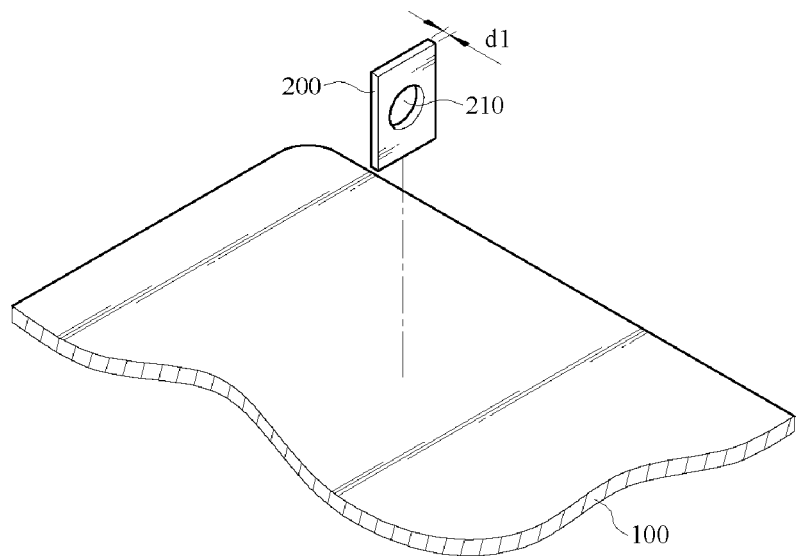
FIG. 2 to FIG. 4 are manufacturing process views (No. 1 to No. 3) for manufacturing a battery shell of an electronic device according to an embodiment.
Figure 3:
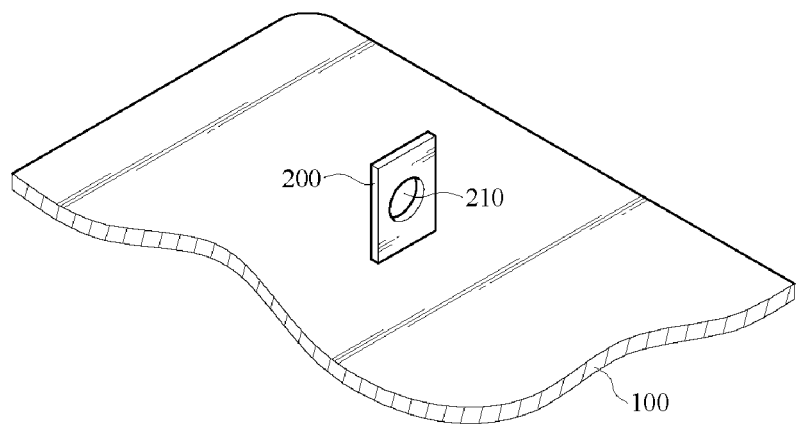
Figure 4:
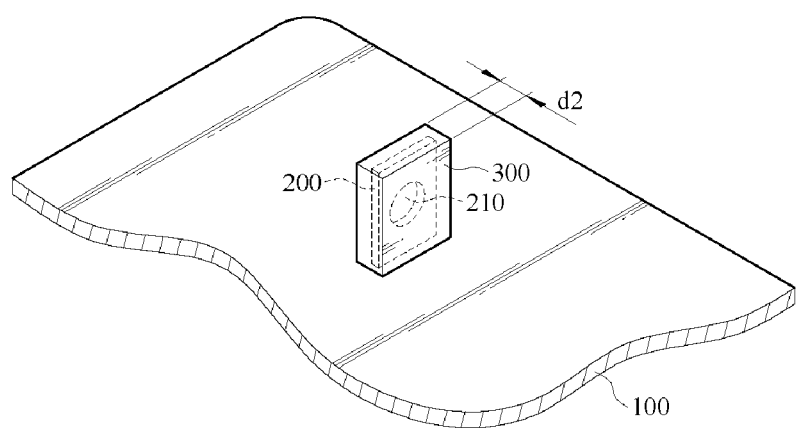

Please refer to FIG. 1 to FIG. 4. FIG. 1 is a schematic view of an electronic device according to the first embodiment, FIG. 2 to FIG. 4 are manufacturing process views (No. 1 to No. 3) for manufacturing a battery shell of an electronic device according to an embodiment.

An embodiment discloses a method for manufacturing a battery shell applicable to an electronic device is to manufacture a battery shell structure of an electronic device. The method comprises:

First, provide a metal substrate 100 (S1), as shown in FIG. 2. The material of the metal substrate 100 may be an aluminum alloy or a magnesium alloy, but not limited to the embodiment.

Provide a metal implanting component 200 including a bonding part 210 disposed thereon (S2), as shown in FIG. 2. The material of the above-mentioned metal implanting component 200 may be the same as that of the metal substrate 100, but not limited to the embodiment. For example, in another embodiment, the material of the metal implanting component 200 may be different from that of the metal substrate 100. Moreover, the above-mentioned connecting part 210 is a through hole, but not limited to the embodiment.

Bond the metal implanting component 200 to the metal substrate 100 (S3) so that the metal implanting component 200 is erected on the surface of the metal substrate 100, as shown in FIG. 3. In addition, the method of bonding the metal implanting component 200 to the metal substrate 100 can be spot welding or ultrasonic welding, but not limited to the embodiment.

Form a plastic component 300 on the metal substrate 100 by an insert molding process (S4). The plastic component 300 covers the metal implanting component 200, and the plastic component 300 is bonded to the bonding part 210 of the metal implanting component 200, as shown in FIG. 4.

In the above-mentioned insert molding process, the metal substrate 100 and the metal implanting component 200 may be inserted into a plastic injection mold, then a melted plastic material is injected on the metal implanting component 200 along an injection channel by an injection molding machine. As a result, after the plastic material is solidified to form the plastic component 300, the plastic component 300 may cover the whole metal implanting component 200. In addition, the bonding part 210 is used for enforcing the bonding effect of the plastic component 300 to the metal implanting component 200.

Therefore, after the plastic component 300 is formed on the metal implanting component 200, the plastic component 300 may be securely fixed on the metal substrate 100 by covering the metal implanting component 200 with the plastic component 300. In this embodiment, on the metal substrate 100 the plastic component 300, having a small volume and a thin profile, is formed and erected on the metal substrate 100 by insert molding according to the method of manufacturing the battery shell applicable to the electronic device. For example, in actual manufacturing, the thickness d1 of the metal implanting component 200 may be less than or equal to 0.2 mm (millimeters) and the thickness d2 of the formed plastic component 300 may be less than or equal to 0.8 mm.

Furthermore, even if the bonding area between the plastic component 300 and the metal substrate 100 is extremely small, the metal implanting component 200 used in the bonding method of the embodiment may increase the bonding strength between the plastic component 300 and the metal substrate 100. In contrast to a traditional bonding method that a plastic component is formed on a metal substrate by insert molding, the plastic component may not be bonded to the metal substrate securely if the bonding area between the plastic component and the metal substrate is too small. Therefore, the traditional manufacturing process may not form the metal implanting component 200 with a thickness less than or equal to 0.8 mm in the figure of the embodiment.

Figure 5:
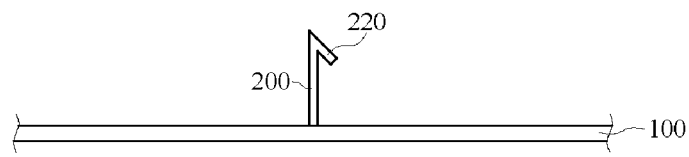
FIG. 5 is a schematic view of a metal component according to another embodiment.
Figure 6:
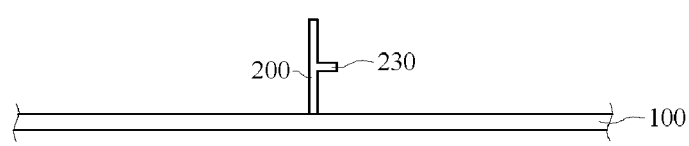
FIG. 6 is a schematic view of a metal component according to another embodiment.
Figure 7:
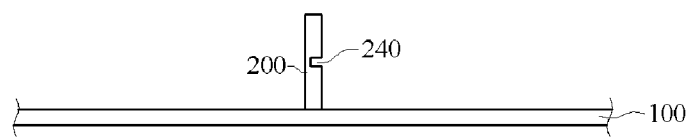
FIG. 7 is a schematic view of a metal component according to another embodiment.

Please refer to FIG. 5 to FIG. 7, FIG. 5 is a schematic view of a metal component according to another embodiment, FIG. 6 is a schematic view of a metal component according to another embodiment, FIG. 7 is a schematic view of a metal component according to another embodiment.

In the above-mentioned embodiments, the bonding part 210 is a through hole for enhancing the bonding strength between the plastic component 300 and the metal substrate 100. However, the structure of the bonding part 210 is not limited to the through hole. For example, in another embodiment, the bonding part 220 is a hook, as shown in FIG. 5. Or, the bonding part 230 is a protruding rib, as shown in FIG. 6. Or, the bonding part 240 is a groove, as shown in FIG. 7.

According to the above-mentioned embodiments applicable to the method of manufacturing the battery shell of the electronic device, the plastic component is securely fixed on the metal substrate by covering the metal implanting component of the metal substrate with the plastic component. Therefore, when the bonding area between the plastic component and the metal substrate is extremely small, the method of manufacturing the battery shell applicable to the electronic device, according to the above-mentioned embodiments, may still achieve the better bonding effect of the plastic component to the metal substrate.

Note that the specifications relating to the above embodiments should be construed as exemplary rather than as limitative of the present invention, with many variations and modifications being readily attainable by a person skilled in the art without departing from the spirit or scope thereof as defined by the appended claims and their legal equivalents.

What is claimed is:

1. A method for manufacturing a battery shell applicable to an electronic device, comprising:

providing a metal substrate, and a metal implanting component including a bonding part disposed thereon;

bonding the metal implanting component to the metal substrate; and forming a plastic component on the metal substrate by an insert molding process;

wherein the plastic component covers the metal implanting component, and the plastic component is bonded to the bonding part of the metal implanting component.

2. The method for manufacturing the battery shell applicable to the electronic device according to claim 1, wherein the bonding part is a through hole.

3. The method for manufacturing the battery shell applicable to the electronic device according to claim 1, wherein the bonding part is a protruding rib.

4. The method for manufacturing the battery shell applicable to the electronic device according to claim 1, wherein the bonding part is a hook.

5. The method for manufacturing the battery shell applicable to the electronic device according to claim 1, wherein the bonding part is a groove.

6. The method for manufacturing the battery shell applicable to the electronic device according to claim 1, wherein the metal implanting component is implanted in the metal substrate by spot welding.

7. The method for manufacturing the battery shell applicable to the electronic device according to claim 1, wherein the metal implanting component is implanted in the metal substrate by ultrasonic welding.

8. The method for manufacturing the battery shell applicable to the electronic device according to claim 1, wherein the thickness of the metal implanting component is less than or equal to 0.2 mm (millimeters).

9. The method for manufacturing the battery shell applicable to the electronic device according to claim 1, wherein the thickness of the plastic component is less than or equal to 0.8 mm.

10. A battery shell manufactured by a method for manufacturing a battery shell applicable to an electronic device according to claim 1.

* * * * *